(12) United States Patent
Wu

(10) Patent No.: US 9,097,859 B2
(45) Date of Patent: Aug. 4, 2015

(54) OPTICAL COUPLER

(71) Applicant: Kai-Wen Wu, New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 326 days.

(21) Appl. No.: 13/655,521

(22) Filed: Oct. 19, 2012

(65) Prior Publication Data

US 2013/0170795 A1 Jul. 4, 2013

(30) Foreign Application Priority Data

Dec. 29, 2011 (TW) .............................. 100149480 A

(51) Int. Cl.
*G02B 6/32* (2006.01)
*G02B 6/38* (2006.01)
*G02B 6/42* (2006.01)

(52) U.S. Cl.
CPC *G02B 6/32* (2013.01); *G02B 6/387* (2013.01); *G02B 6/3882* (2013.01); *G02B 6/4214* (2013.01); *G02B 6/3885* (2013.01)

(58) Field of Classification Search
None
See application file for complete search history.

(56) References Cited

U.S. PATENT DOCUMENTS

| | | | | |
|---|---|---|---|---|
| 6,956,995 | B1* | 10/2005 | Shafaat et al. | 385/39 |
| 7,369,328 | B2* | 5/2008 | Yamamoto et al. | 359/726 |
| 8,469,610 | B2* | 6/2013 | Shao et al. | 385/93 |
| 8,554,030 | B2* | 10/2013 | Noguchi | 385/33 |
| 8,620,122 | B2* | 12/2013 | Meadowcroft et al. | 385/50 |
| 2007/0297729 | A1* | 12/2007 | Kodama et al. | 385/94 |
| 2011/0123150 | A1* | 5/2011 | Zbinden et al. | 385/33 |
| 2013/0322831 | A1* | 12/2013 | Sakurai et al. | 385/89 |
| 2014/0193116 | A1* | 7/2014 | Bylander et al. | 385/33 |

* cited by examiner

*Primary Examiner* — Michelle R Connelly
(74) *Attorney, Agent, or Firm* — Novak Druce Connolly Bove + Quigg LLP

(57) ABSTRACT

An optical coupler includes a male port and a female port. The male port includes a first main body, a first optical fiber, and a male port lens unit. The male port lens unit includes a first base body, a first male port lens coupling with the first optical fiber, and a second male port lens. The first base body includes a male port reflecting sidewall. The female port includes a second main body, a second optical fiber, and a female port lens unit. The female port lens unit includes a second base body, a first female port lens coupling with the second optical fiber, and a second female port lens coupling with the second male port lens. The second base body includes a female port reflecting surface parallel with the male port reflecting sidewall.

8 Claims, 5 Drawing Sheets

OPTICAL COUPLER

PRIORITY

This application claims all benefits accruing under 35 U.S.C. §119 from Taiwan Patent Application No. 100149480, filed on Dec. 29, 2011, in the Taiwan Intellectual Property Office, the disclosure of which is incorporated herein by reference.

BACKGROUND

1. Technical Field

The present disclosure relates to optical fiber couplers, particularly to an optical fiber coupler with a male port and a female port.

2. Description of Related Art

An optical coupler may be used to transmit data between electronic devices, such as between a computer and MP3 player, instead of using a USB connector. The optical coupler may include a male port and a female port coupling with the male port. Each male port and the female port includes a plurality of optical lenses, and each male port and female port defines mounting holes for adhering the optical lenses by glue. The optical lenses are mounted into the mounting holes one by one. As a result, assembling of the optical lenses may be time consuming.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
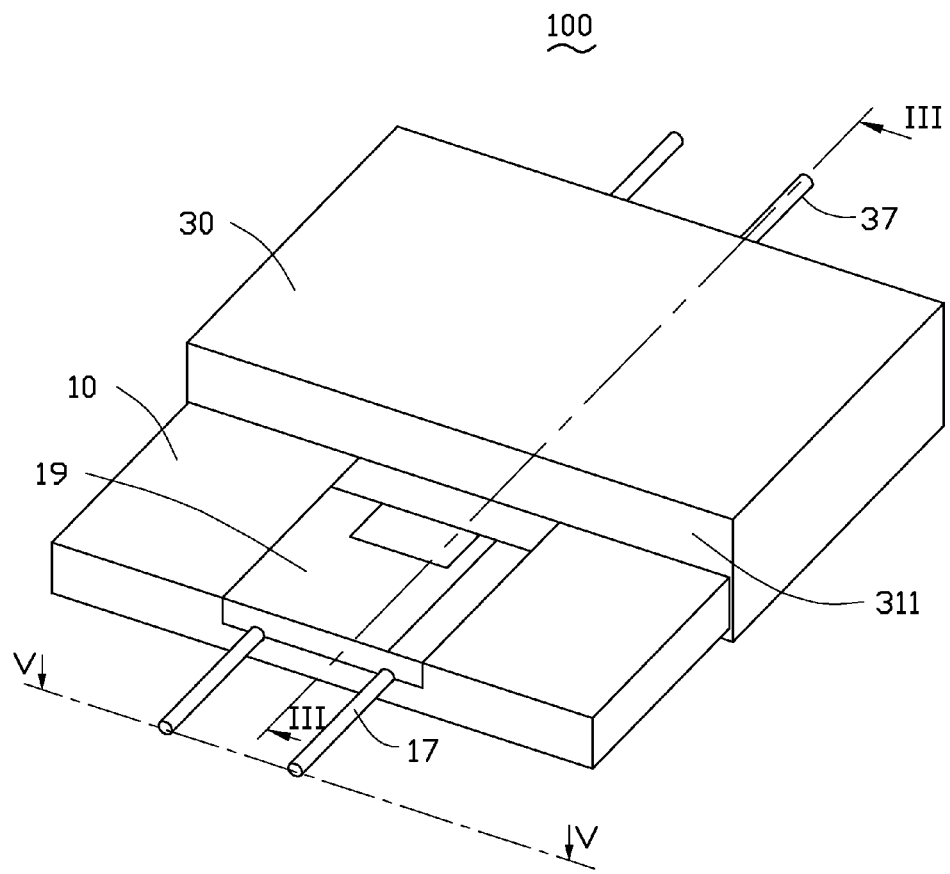
FIG. 1 is an isometric view of an embodiment of an optical fiber coupler including a male port and a female port, the male port including a male port lens unit, the female port including a female port lens unit.

FIG. 1 shows an embodiment of an optical fiber coupler 100. The optical fiber coupler 100 includes a male port 10 and a female port 30 matching with the male port 10. The female port 30 is connected to an electronic device (not shown), such as a computer, a printer, or a camera, for example. The male port 10 is portable, and is configured to couple with the female port 30, for transmitting data from or to the electronic device connected to the female port 30.

Figure 2:
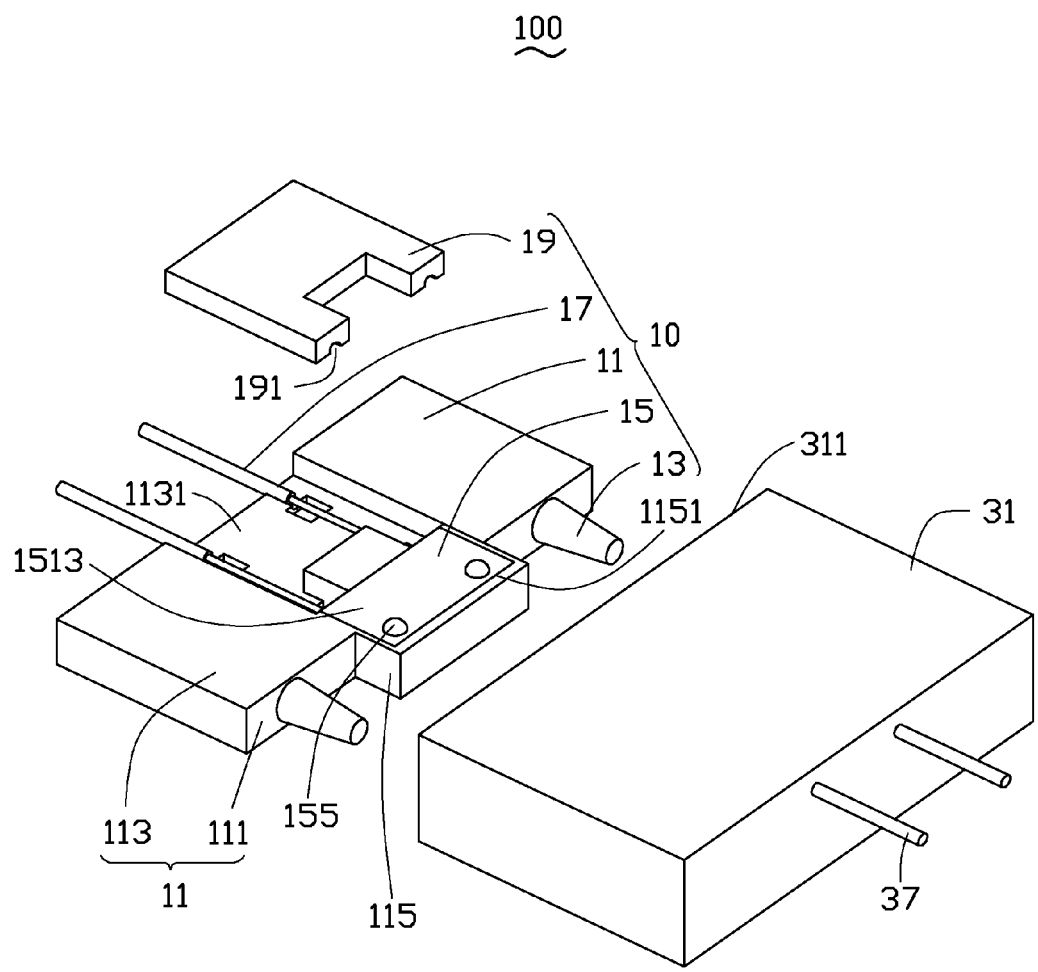
FIG. 2 is an exploded, isometric view of the optical fiber coupler shown in FIG. 1.

FIG. 2 shows a male port 10 including a first main body 11, a pair of connecting portions 13, a male port lens unit 15, a pair of first optical fibers 17, and a positioning cover 19. The first main body 11 is substantially cubic, and includes a first mounting surface 111 and a second mounting surface 113 perpendicularly connected to the first mounting surface 111. A mounting portion 115 perpendicularly protrudes from a substantially middle portion of the first mounting surface 111. A sidewall of the mounting portion 115 is coplanar with the second mounting surface 113. The mounting portion 115 defines a receiving groove 1151 at the sidewall being coplanar with the second mounting surface 113, for mounting the male port lens unit 15. The second mounting surface 113 defines a U-shaped mounting groove 1131, for mounting the first optical fibers 17 and the positioning cover 19. A pair of protruding portions of the U-shaped mounting groove 1131 extends towards to the mounting portion 115.

The connecting portions 13 perpendicularly protrude from two opposite ends of the first mounting surface 111, and are located at opposite sides relative to the mounting portion 115. Each of the pair of connecting portions 13 is substantially a conical frustum, and a diameter thereof gradually decreases along a direction away from the first mounting surface 111.

Figure 3:
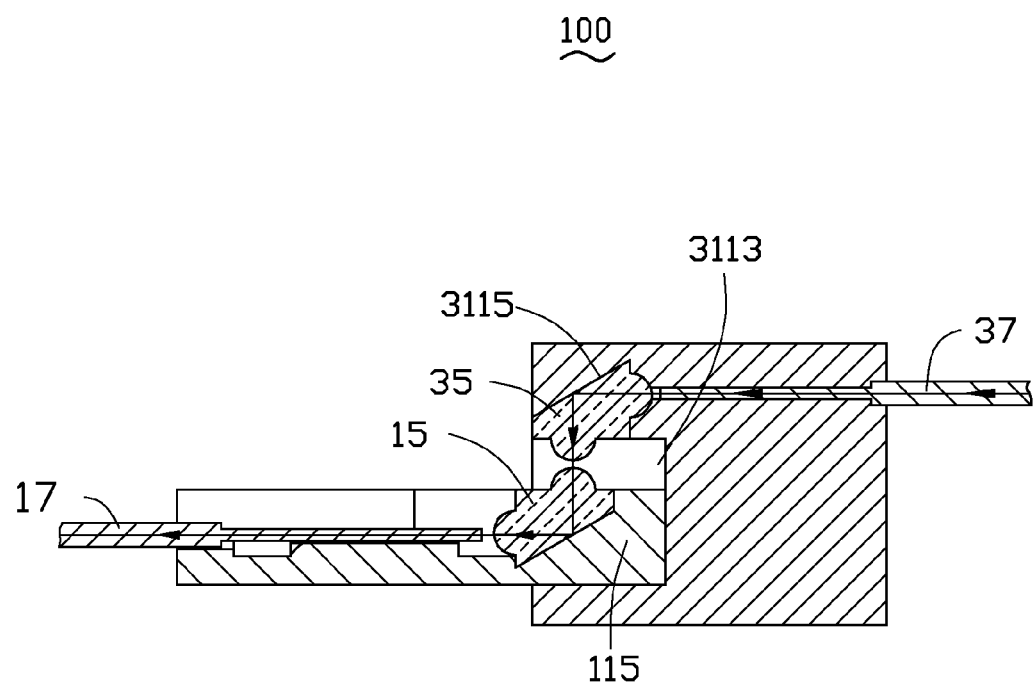
FIG. 3 is a sectional view taken along line III-III of FIG. 1.
Figure 4:
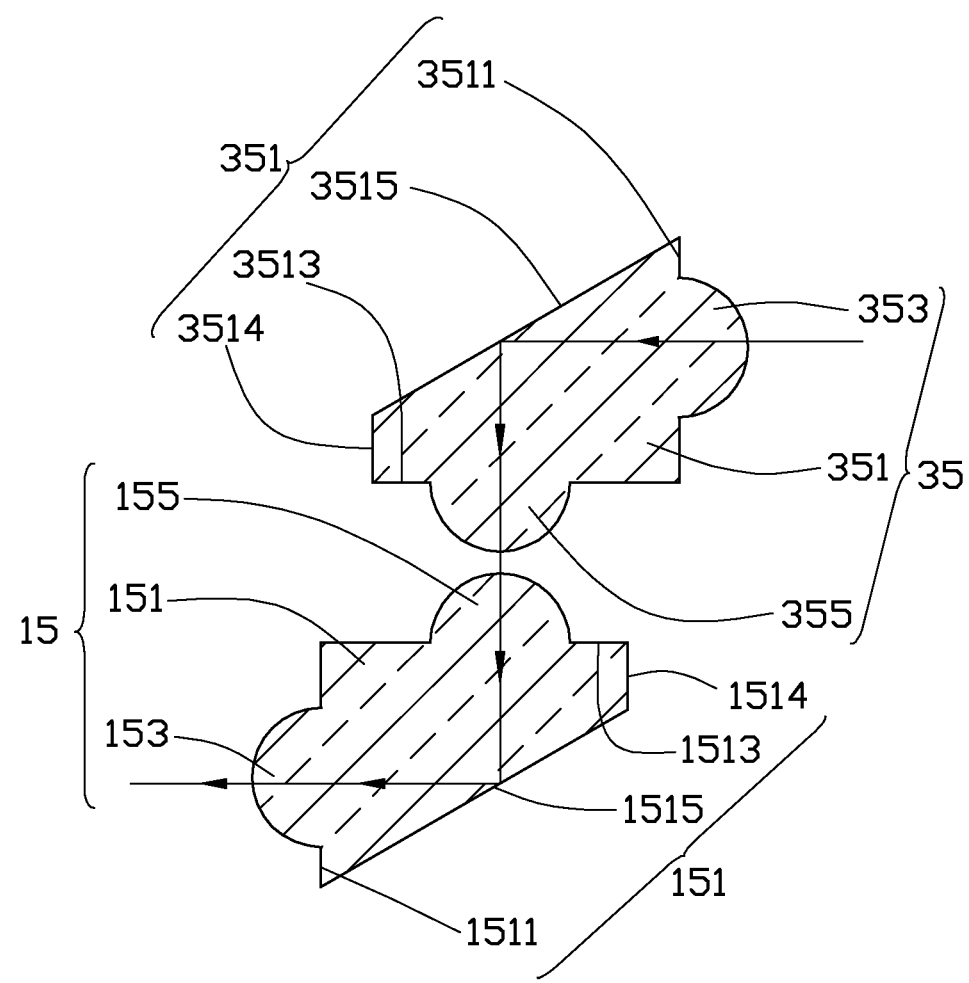
FIG. 4 is a sketch view of light beams transmitting in the male port lens unit and the female port lens unit shown in FIG. 1.

FIGS. 3 and 4 show a male port lens unit 15 mounted on the receiving groove 1151. The male port lens unit 15 includes a first base body 151, a pair of first male port lenses 153, and a pair of second male port lenses 155. The pair of first male port lenses 153 and the pair of second male port lenses 155 are respectively mounted on two sidewalls perpendicular to each other of the first base body 151.

The first base body 151 is substantially a trapezoid block, and includes a first sidewall 1511, a second sidewall 1513, a third sidewall 1514, and a male port reflecting sidewall 1515 connected one by one. The first sidewall 1511 is perpendicular to the second sidewall 1513 and the second mounting surface 113. The second sidewall 1513 is coplanar to the second mounting surface 113. The third sidewall 1514 is perpendicular to the second sidewall 1513, and parallel to the first sidewall 1511. The male port reflecting sidewall 1515 is inclined relative to the first sidewall 1511 and the third sidewall 1514, and the male port reflecting sidewall 1515 faces a bottom of the receiving groove 1151. The first male port lenses 153 and the second male port lenses 155 are positioned at a same side of the male port reflecting sidewall 1515. In the illustrated embodiment, an included angle between the male port reflecting sidewall 1515 and the second sidewall 1513 is 45 degrees.

The first male port lenses 153 are mounted on the first sidewall 1511 arranged apart. The second male port lenses 155 are mounted on the second sidewall 1513 arranged apart, and each of the pair of second male port lenses 155 and each of the pair of first male port lenses 153 are located at a plane perpendicular to the first sidewall 1511 and the second sidewall 1513. In the illustrated embodiment, the male port lens unit 15 is integrated by a transparent organic glass.

The first optical fibers 17 are mounted on the mounting groove 1131 corresponding to the first male port lenses 153, parallel to each other. A distal end of each first optical fiber couples with each of the pair of first male port lenses 153, for transmitting optical signals.

The positioning cover 19 matches the mounting groove 1131, and defines a pair of positioning grooves 191 at opposite sides of a bottom surface corresponding to the first optical fibers 17, for receiving and positioning the first optical fibers 17, thus the first optical fibers 17 are located between the positioning cover 19 and the first main body 11.

Figure 5:
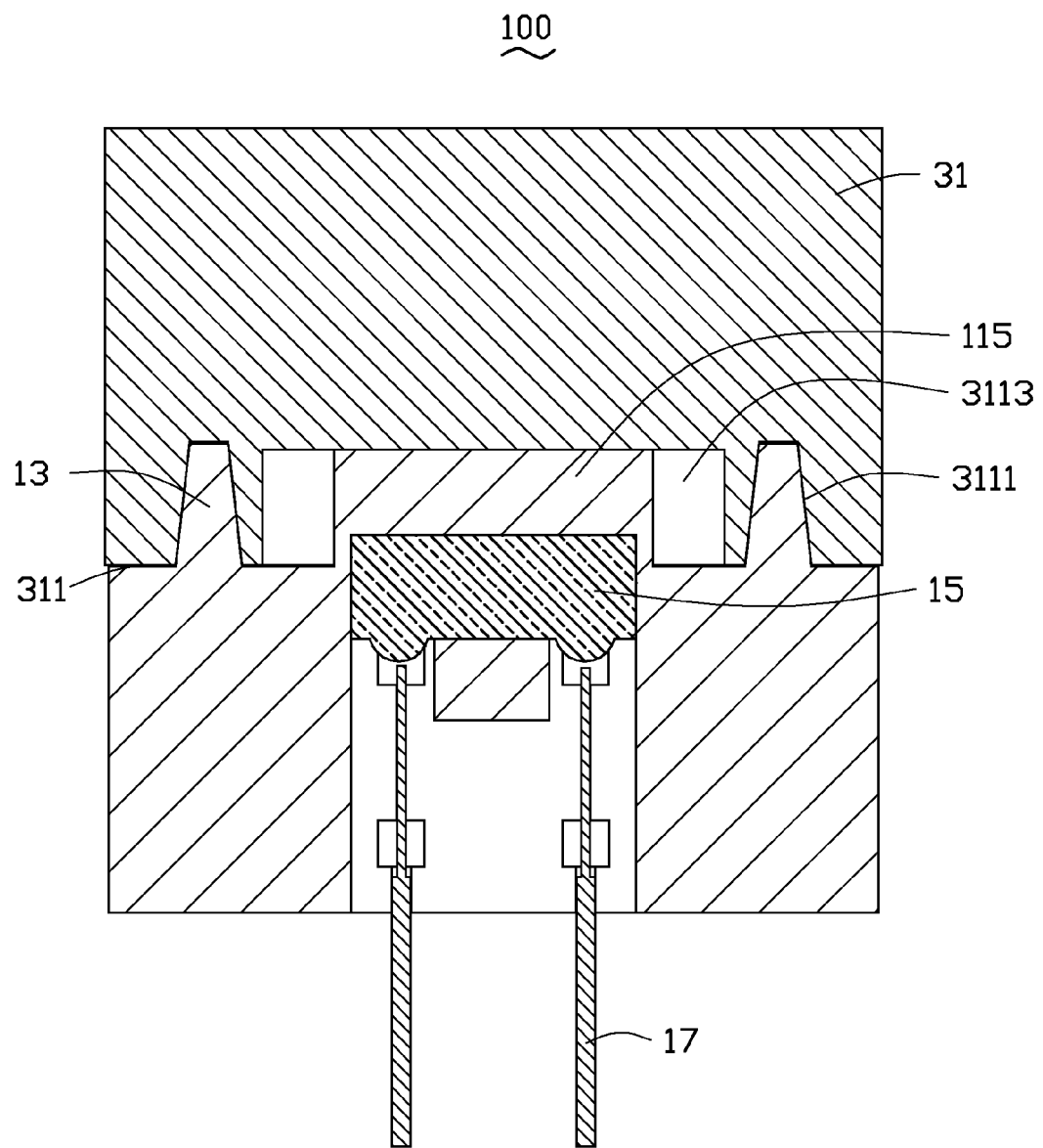
FIG. 5 is a partial, sectional view taken along line V-V of FIG. 1.

FIGS. 4 and 5 show a female port 30 having a substantially similar structures with the male port 10. The female port 30 includes a second main body 31, a female port lens unit 35, and a pair of second optical fibers 37. The second main body 31 includes a connecting surface 311 towards the first mounting surface 111 of the male port 10. The connecting surface 311 defining a pair of latching grooves 3111 and a containing groove 3113 located between the latching grooves 3111. The latching grooves 3111 are located at opposite ends of the connecting surface 311 corresponding to the connecting portions 13, and latch with the connecting portions 13 for positioning the male port 10 to the female port 30. The latching grooves are substantially conical frustum-shaped, and a diameter of the latching groove is gradually decreased along a direction away from the connecting surface 311.

The containing groove 3113 is located a substantial middle portion of the connecting surface 311 corresponding to the mounting portion 115, for receiving the mounting portion 115. A top surface of the containing groove 3113 defines a mounting hole 3115, for mounting the female port lens unit 35.

The female port lens unit 35 is mounted on the mounting hole 3115, and includes a second base body 351, a pair of first female port lenses 353, and a pair of second female port lenses 355. The pair of first female port lenses 353 and the pair of second female port lenses 355 are respectively mounted on two perpendicular positioned sidewalls of the second base body 351.

The second base body 351 is substantially a trapezoid block, and includes a first surface 3511, a second surface 3513, a third surface 3514, and a female port reflecting surface 3515 connected one by one. The first surface 3511 is perpendicular to the second surface 3513 and the top surface of the containing groove 3113. The second surface 3513 is coplanar to top surface of the containing groove 3113. The third surface 3514 is perpendicular to the second surface 3513, parallel to the first surface 3511. The female port reflecting surface 3515 is inclined relative to the first surface 3511 and the third surface 3514, and the female port reflecting surface 3515 faces a bottom of the mounting hole 3115. The first female port lenses 353 and the second female port lenses 355 are positioned at a same side of the female port reflecting surface 3515. The female port reflecting surface 3515 is parallel with the male port reflecting sidewall 1515. In the illustrated embodiment, an included angle between the female port reflecting surface 3515 and the second surface 3513 is 45 degrees.

The first female port lenses 353 are mounted on the first surface 3511 arranged apart. The second female port lenses 355 are mounted on the second surface 3513 arranged apart, and each of the pair of second female port lenses 355 and each of the pair of first female port lenses 353 are located at a plane perpendicular to the first surface 3511 and the second surface 3513. In the illustrated embodiment, the female port lens unit 35 is integrated by a transparent organic glass.

The second optical fibers 37 pass through the second main body 31 corresponding to the first female port lenses 353, and parallel to each other. A distal end of each second optical fiber couples with each of the pair of first female port lenses 353, for transmitting optical signals.

In use, The female port 30 is connected to an electronic device (not shown), and the male port 10 couples with the female port 30, for transmitting optical signals from the female port 30 to the male port 10 or from the male port 10 to the female port 30. Each of the pair of connecting portions 13 is inserted into the latching grooves 3111, and the mounting portion 115 is received in the containing groove 3113. Thus the second male port lenses 155 align and couple with the second female port lenses 355.

Referring to FIG. 4, light paths are shown when transmitting optical signals (only show the light paths when the optical signals are transmitted from the female port 30 to the male port 10). The optical signals from the electronic device are transmitted to the second optical fibers 37, and then collected by the first female port lenses 353 to female port reflecting surface 3515. The female port reflecting surface 3515 reflects the optical signals to the second female port lenses 355 perpendicular to the incident optical signals. The reflected optical signals are transmitted to the male port reflecting sidewall 1515 via the second female port lenses 355 and the second male port lenses 155. The male port reflecting sidewall 1515 reflects the optical signals to the first male port lenses 153, and then the optical signals are transmitted to the first optical fibers 17. Thus the optical signals are transmitted from the second optical fibers 37 to the first optical fibers 17. When optical signals are transmitted from the first optical fibers 17 to the second optical fibers 37, light paths are opposite to aforementioned light paths.

In other embodiments, the number of the pair of first male port lenses 153 can be one or more, and the number of the pair of second male port lenses 155, the first female port lenses 353, and the second female port lenses 355 are changed to one or more correspondingly. The first optical fibers 17 and the second optical fibers 37 can be one or more. The number of the pair of connecting portions 13 can be one or more, and the number of the pair of latching grooves 3111 can be one or more corresponding to the connecting portions 13. The included angle between the male port reflecting sidewall 1515 and the second sidewall 1513 can be other degrees, such as 30 degrees, for example.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An optical coupler, comprising:
a male port comprising a first main body, at least one connecting portion, at least one first optical fiber, and a male port lens unit, the at least one connecting portion protruding from the first main body, the at least one first optical fiber being inserted into the first main body, the male port lens unit comprising a first base body, at least one first male port lens and at least one second male port lens, both the at least one first male port lens and the at least one second male port lens being mounted on the first base body, the first base body being mounted on the first main body, the first base body comprising a male port reflecting sidewall, the at least one first male port lens and the at least one second male port lens being positioned at a same side of the male port reflecting sidewall, the at least one first male port lens being coupled with the at least one first optical fiber, the at least one second male port lens being configured to transmit optical signals to the male port reflecting sidewall, and the male port reflecting sidewall being configured to reflect the optical signals to the at least one first optical fiber via the at least one first male port lens; and
a female port comprising a second main body, at least one second optical fiber, and a female port lens unit, the second main body defining at least one latching groove correspondingly positioned relative to the at least one connecting portion, the at least one second optical fiber being inserted into the second main body, the female port lens unit comprising a second base body, at least one first female port lens and at least one second female port lens, both the at least one first female port lens and the at least one second female port lens being mounted on the second base body, the second base body being mounted on the second main body, the second base body comprising a female port reflecting surface parallel with the male port reflecting sidewall, the at least one first female port lens and the at least one second female port lens being positioned at a same side of the female port reflecting surface, the at least one first female port lens being coupled with the at least one second optical fiber, the at least one second female port lens being coupled with the at least one second male port lens, the at least one first female port lens being configured to transmit optical signals from the at least one second optical fiber to the female port reflecting surface, and the female port reflecting surface being configured to reflect the optical signals to the at least one second male port lens via the at least one first female port lens;

wherein the first main body comprises a first mounting surface, the at least one connecting portion is perpendicularly protruding from the first mounting surface, the second main body comprises a connecting surface, the at least one latching groove is defined on the connecting surface, the at least one connecting portion is latched with the at least one latching groove;

a mounting portion perpendicularly protrudes from the first mounting surface, the connecting surface further defines a containing groove besides the at least latching groove, the mounting portion is received in the containing groove;

the mounting portion defines a receiving groove at a sidewall, the male port lens unit is received in the receiving groove;

the first main body further comprises a second mounting surface perpendicular to the first mounting surface, and the second mounting surface is coplanar with the sidewall of the mounting portion defining the receiving groove;

the second mounting surface defines a mounting groove, the at least one first optical fiber is received in the mounting groove, and couples with the at least one first male port lens;

the male port further comprises a positioning cover configured to match with the mounting groove, the positioning cover defines at least one positioning groove for positioning the at least one first optical fiber, the at least one first optical fiber is received in the at least one positioning groove.

2. The optical coupler of claim 1, wherein the first base body further comprises a first sidewall, a second sidewall, and a third sidewall, each end of the male port reflecting sidewall is connected with each the first sidewall and the third sidewall, the second side wall is connected with the third side wall opposite to the male port reflecting sidewall, the first sidewall is perpendicular to the second sidewall, the second sidewall is coplanar with the second mounting surface, the male port reflecting sidewall is inclined relative to the first sidewall, the at least one first male port lens is mounted on the first sidewall, the at least one second male port lens is mounted on the second sidewall.

3. The optical coupler of claim 2, wherein the male port reflecting sidewall is inclined from the second sidewall at 45 degrees.

4. The optical coupler of claim 1, wherein a top surface of the containing groove defines a mounting hole, the female port lens unit is received in the mounting hole.

5. The optical coupler of claim 4, wherein the second base body further comprises a first surface, a second surface, and a third surface, each end of the female port reflecting surface is connected with each of the first surface and the third surface, the second surface is connected with the third surface opposite to the female port reflecting surface, the first surface is perpendicular to the second surface, the second surface is coplanar with the top surface of the containing groove, the female port reflecting surface is inclined relative to the first surface, the at least one first female port lens is mounted on the first surface, the at least one second female port lens is mounted on the second surface.

6. The optical coupler of claim 5, wherein the female port reflecting surface is inclined from the second surface at 45 degrees.

7. A male port, comprising:
a first main body;
at least one connecting portion protruding from the first main body;
at least one first optical fiber being inserted into the first main body; and
a male port lens unit comprising a first base body, at least one first male port lens and at least one second male port lens, both the at least one first male port lens and the at least one second male port lens being mounted on the first base body, the first base body being mounted on the first main body, the first base body comprising a male port reflecting sidewall, the at least one first male port lens and the at least one second male port lens being positioned at a same side of the male port reflecting sidewall, the at least one first male port lens being coupled with the at least one first optical fiber, the at least one second male port lens being configured to transmit optical signals to the male port reflecting sidewall, and the male port reflecting sidewall being configured to reflect the optical signals to the at least one first optical fiber via the at least one first male port lens;

wherein the first main body comprises a first mounting surface and a second mounting surface perpendicular to the first mounting surface, the second mounting surface defines a mounting groove, the at least one first optical fiber is received in the mounting groove, and couples with the at least one first male port lens;

the male port further comprises a positioning cover configured to match with the mounting groove, the positioning cover defines at least one positioning groove for positioning the at least one first optical fiber, the at least one first optical fiber is received in the at least one positioning groove.

8. The male port of claim 7, wherein the first base body further comprises a first sidewall, a second sidewall, and a third sidewall, each end of the male port reflecting sidewall is connected with each the first sidewall and the third sidewall, the second side wall is connected with the third side wall opposite to the male port reflecting sidewall, the first sidewall is perpendicular to the second sidewall, the second sidewall is coplanar with the second mounting surface, the male port reflecting sidewall is inclined relative to the first sidewall, the at least one first male port lens is mounted on the first sidewall, the at least one second male port lens is mounted on the second sidewall.

* * * * *